Figure 1:
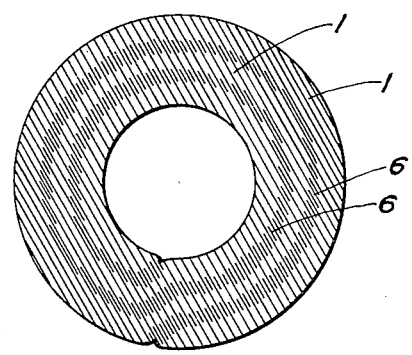

Nov. 27, 1956 M. F. MEISSNER 2,772,121
COMPOSITE SHEET METAL ARTICLE AND METHOD OF MANUFACTURE
Filed Jan. 17, 1952

INVENTOR.
MILTON F. MEISSNER
BY
John R. Wilkins
AGENT

United States Patent Office 2,772,121
Patented Nov. 27, 1956

2,772,121

COMPOSITE SHEET METAL ARTICLE AND METHOD OF MANUFACTURE

Milton F. Meissner, Ladue, Mo., assignor to Olin Mathieson Chemical Corporation, a corporation of Virginia Application January 17, 1952, Serial No. 266,953

10 Claims. (Cl. 29—199)

This invention relates to copper products such as tubing and other containers and to improvements in the manufacture of such products from sheet metal.

In hydraulic systems containing or conveying fluids such as gasoline, oil, brake fluid, or water, copper tubing is frequently employed as the conduit since copper is fairly resistant to corrosion and is sufficiently ductile and malleable to permit the tubing being bent to conform to various irregular spaces and sharp turns in the installation without resort to threading apparatus and a great number of elbow fittings. For the sake of economy, it is desired that this tubing be of the longitudinally seamed composite type fabricated from a strip or ribbon of ductile metal in the manner disclosed in U. S. Patent No. 1,476,796 which is cheaper to manufacture than tubing of the seamless extruded type. Likewise in high pressure fluid systems of heating or cooling apparatus plate-like or tubular copper heat exchange structures are frequently employed and here too it would be desirable from the view point of economy that these heat exchangers be of the composite type made of sheet metal rather than of a seamless extruded or cast structure. However, as high pressure copper tubing for use in the hydraulic systems of air craft, for example, composite tubing made in accordance with the practices heretofore common has proved unsatisfactory. The chief cause of failure has been the use of ordinary low temperature or soft solders which fracture after a short time when subject to the succession of extremes of operating temperatures and pressures encountered. Although the interposition of higher melting point material such as the hard solders and brazing alloys for joining makes a better bond between plys of this type of tubing, in practice it has been found that the higher temperatures required to bring about joinder by means of the interposed high melting material exceeds the softening temperature of copper and most of its ductile copper rich alloys such as Lake copper, or copper bearing a small percentage of phosphorus or cadmium. For example, when tin is used as the solder, temperatures in the vicinity of 232° C. and somewhat above are employed and the resultant composite copper tube fails to meet the requirement for high pressure applications largely because the copper is annealed into a softened condition. Many other joining materials are objectionable because they tend to produce a joint lacking in the required degree of ductility or because of their tendency to accelerate corrosion. In general, dependence upon any interposed material to constitute the bond between plys is responsible for disadvantages because of the limitations or undesirable properties of such material.

One object of this invention, therefore, is to provide a metal composite article of manufacture characterized by improved strength. Another object is to economically provide flexible high pressure tubing and also an improved method of manufacture of such tubing and the like. A further object is to manufacture from easily worked cuprous sheet metal a composite article of manufacture of the type described, free of the disadvantages heretofore experienced because of the presence and heating of interposed joining metals such as solder and various brazing alloys. A still further object is to provide improved tubing and a novel method of making such tubing from a copper base alloy.

Figure 2:
Figure 3:

Other objects of the invention will appear from the following description and accompanying drawing in which:

Fig. 1 is a view in cross-section of a completed tube made in accordance with this invention, Fig. 2 is an enlarged view representative of a cross-section of one portion at the juxtaposed surfaces of a pair of adjacent plys of the composite article of Fig. 1 showing the microstructure of the basic sheet metal strip and the adherent tin coatings prior to joinder as revealed by a micrograph (magnification 250 diameters), and Fig. 3 is another enlarged view representative of such an interfacial portion after joinder showing the type of bond obtained.

In accordance with this invention there is provided in the fabrication of composite articles such as tubing and the like, a sheet metal stock preferably a copper base alloy ductile, workable and corrosion resistant in much the same way as copper but capable of retaining high strength after heating at elevated temperatures and having the surfaces of the sheet treated with tin to facilitate joinder of two or more plys of such surface treated alloy stock at elevated temperature and under clamping pressure. In making such composite metal structures, it was found that, if instead of solder coated sheet copper there is provided a sheet the body or base of which consists of a corrosion resistant ductile alloy predominantly copper but having a tensile strength of about 45,000 pounds per square inch or better in the annealed state and that if each of the surfaces of this basic sheet which are to be joined are precoated with an extremely thin but uniform layer of tin prior to the bonding operation under heat and pressure, the foregoing objects may be achieved. A preeminently suitable alloy preferred for the base or body of the coated sheet metal stock consists of copper alloyed with small amounts of iron and zinc as disclosed in U. S. Patent No. 2,295,180 (Mitchell). Such alloys are composed of from 80% to 95% copper, from 1.25% to 4% iron and the balance zinc. The thickness of tin coat contemplated is preferably within the range from about 0.00002 of an inch to about 0.0001 of an inch. It is important that the coating of tin be thick enough to accomplish the purpose of this invention but not too heavy because on treatment at elevated temperature needed to accomplish the bond, tin diffusion, if excessive, will impair the ductility of the basic metal of the sheet. Furthermore, if the tin layer is excessively heavy, a final interfacial layer of tin is left between the plys to impair the strength of the finished article. The initial presence of a thin coat of tin on each of the surfaces to be bonded insures the continued freedom from corrosion and oxides of the surfaces and promotes under clamping pressures at a sufficiently high temperature recrystallization across the interface and intergranular joining of the juxtaposed surfaces of the basic high copper alloy sheet. To achieve the desired bonding of the preferred copper-iron-zinc sheet metal base, a temperature of not less than about 900° C. is generally required. For the best union the coated sheet metal surfaces are held in intimate contact while heated to a minimum temperature of about 960° C. but under the melting point of the above noted alloy and under a holding pressure insufficient to cause more than a minor or insubstantial reduction in cross-section of the sheet metal. A metal upset or reduction of not substantially more than about 10% is contemplated. When the process is practiced at temperatures somewhat below 960° C., a succession of applications of rather severe deforming pressures and repeated heatings may be necessary before a bond having any similarity to the type of bond desired may be secured. In the completed composite article made as described herein, the resulting bond is free from an interposed layer of tin while the basic metal of the composite is not impaired by the heat required to accomplish fabrication.

In accordance with a preferred embodiment of the invention a composite high pressure tube of the type shown in Fig. 1 is made from a narrow but relatively extremely long tin clad sheet metal strip or ribbon 1 having a cuprous base composed of between 92% and 94% copper, between 2% and 2.6% iron and the balance zinc. A strip having a thickness of about 0.014 of an inch, for example, is provided on both surfaces with a coating of tin of a thickness of approximately 0.00005 of an inch. In application of the tin the electrodeposition method is preferred but any other method such as wiping may be employed provided a thick or irregular coat is avoided. The precoated sheet metal strip 1 is then manipulated in suitable apparatus so as to bend and enfold the strip longitudinally to form a convolutely wound tube, preparatory to integration of the laminar tube structure shown in Fig. 1. Manipulation of the clad sheet metal strip is done in such a manner that the tin cladding 3 of one portion 2 of the base metal strip 1 is pressed tightly into contact with the tin cladding 4 of another portion 5 of the base metal as is shown in Fig. 2. Thus positioned and while held together by means of a die or by a press or by a battery of pinch rolls, the convolute assembly with a total of 0.0001 of an inch of tin between contiguous surfaces is rapidly heated in suitable apparatus to a temperature of at least 960° C. but not above 1000° C. and held at this temperature for a matter of about 30 seconds. At temperatures below 900° C. the bond at best is spotty and unreliable. Even at temperatures around 800° C. the interfacial layer of tin exists as a separate molten layer of metal. After the bond is achieved prolonged heating works no improvement. For example, an assembly treated at temperature for the long time of 20 minutes was found to be no better bonded than one treated for 5 minutes.

Unlike the conventional tinning or soldering operations, for which temperatures somewhat in excess of 232° C. are adequate, and which are characterized by an interfacial film of solder in the bond, in the manufacture of the composite structure of this invention, grain growth occurs across the original interface of tin and the plys of base metal are bonded together in such a way that the tin has disappeared and the original parting line is nearly obliterated, being replaced, as in evident from Fig. 3, by an interfacial layer or region 6 of large crystals. The bond consists not of tin and is not characterized by a wide area of tin diffusion but consists of a thin layer of adherent or coalesced recrystallized surface grains of the juxtaposed portions 2 and 5 of the base metal alloyed with substantially all of the tin. The resulting intergranular union is free of a brittle second phase such as delta tin as might have been expected in the bonded area; and the metal in the area of the union is practically as ductile as the base metal. Comparison of Diamond Pyramid Hardness readings revealed a spread of only 10 points between the base metal and the recrystallized metal in the area of the bond. The copper alloy base metal, after bonding has been accomplished as set forth herein, retains a tensile strength of approximately 46,000 pounds per square inch as compared with 34,000 pounds per square inch for dead soft copper, while the character of the bond between sheets of the base metal is similar to that of an autogenous weld.

It will be seen from the foregoing description of one embodiment of the invention that there has been provided a composite sheet metal tube considerably stronger than seamed copper tubing bonded with any of the soft solders, and considerably more ductile than seamed copper tubing bonded with a brazing alloy such as phosphorus copper. Furthermore, the tube produced consists of less metal and has less weight than extruded soft copper tubing of equivalent strength. Another advantage obtained by means of this invention is that composite articles may be made from sheet metal not only without need for filler metal from rods or sheets of solder and the like but also without the use of heavy rolling or extrusion or swaging apparatus necessary to obtain such autogenous bonding at high temperature as is attainable only by means of considerable deformation and up-setting of the metal.

It is obvious that the integrated composite copper base alloy structure of this invention is suitable for applications where a soft copper article bonded in the ordinary way would not even be considered for use.

It is to be understood that composite articles may be fabricated in accordance with this invention not only from one but also from two or more sheets of the tin coated cuprous metal described herein. The term "cuprous metal" is used to designate a sheet metal largely copper but modified with alloying constituents to impart a high tensile strength retainable after the metal has been cooled from the high temperatures of the bonding operation without serious impairment of the ductility and malleability ordinarily associated with workable alloys of copper. Although the invention has been described with reference to the manufacture of tubing it will be obvious to those skilled in the art that the invention is applicable to the manufacture of many other types of cuprous metal structures and articles and that various changes and modifications may be made without departing from the spirit and scope thereof as defined in the appended claims.

What is claimed is:

1. The method of joining metal surfaces composed of 80% to 95% copper, from 1.25% to 4% iron, and the balance zinc, which comprises coating said surfaces with a layer of tin having a thickness in the range from about 0.00002 of an inch to about 0.0001 of an inch, holding said coated surfaces firmly in contact, and heating the resulting assembly at a temperature above about 960° C. but below the melting point of said metal until said surfaces are joined by an intergranular bond substantially free from unalloyed tin.

2. The method of joining metal surfaces composed of 80% to 95% copper, from 1.25% to 4% iron, and the balance zinc, which comprises coating said surfaces by electrodeposition with a layer of tin having a thickness in the range from about 0.00002 of an inch to about 0.0001 of an inch, holding said coated surfaces firmly in contact, and heating the resulting assembly at a temperature above about 900° C. but below the melting point of said metal until said surfaces are joined by an intergranular bond substantially free from unalloyed tin.

3. The method of joining metal surfaces composed of 80% to 95% copper, from 1.25% to 4% iron, and the balance zinc, which comprises coating said surfaces with a layer of tin having a thickness of about 0.00005 of an inch, holding said coated surfaces firmly in contact, and heating the resulting assembly at a temperature above about 960° C. but below the melting point of said metal until said surfaces are joined by an intergranular bond substantially free from unalloyed tin.

4. The method of fabricating a composite convolute wound longitudinally seamed tube and the like comprising providing a sheet of cuprous metal composed of from about 92% to about 94% copper, from about 2% to 2.6% iron, and the balance zinc; electrocoating each of the surfaces of said sheet to be joined with a layer of tin having a thickness in the range from about 0.00002 of an inch to about 0.0001 of an inch; manipulating and positioning said coated metal sheet to provide a preliminary tube assembly with juxtaposed surfaces of the sheet metal in abutting relationship; holding said coated surfaces firmly in intimate contact at a holding pressure insufficient to cause more than an insubstantial reduction in the thickness of the sheet at a temperature below the melting point of said cuprous metal not less than about 900° C. until the surfaces are joined by an intergranular bond consisting of the recrystallized surface grains of said juxtaposed surfaces together with said tin substantially entirely alloyed with said surface grains.

5. The method of fabricating a composite convolute wound longitudinally seamed tube and the like comprising providing a sheet of cuprous metal composed of from about 92% to about 94% copper, from about 2% to 2.6% iron, and the balance zinc; coating each of the surfaces of said sheet to be joined with a layer of tin having a thickness of about 0.00005 of an inch; manipulating and positioning said coated metal sheet to provide a preliminary tube assembly with juxtaposed surfaces of the sheet metal in abutting relationship; holding said coated surfaces firmly in intimate contact at a holding pressure insufficient to cause more than an insubstantial reduction in the thickness of the sheet at a temperature from about 960° C. to about 1000° C. until the surfaces are joined by an intergranular bond consisting of the recrystallized surface grains of said juxtaposed surfaces together with said tin substantially entirely alloyed with said surface grains.

6. In the method of fabricating a composite multiple ply convolute wound longitudinally seamed tube and the like the improvement of forming the plies of cuprous sheet metal composed of from about 80% to about 95% copper, from about 1.25% to about 4% iron and the balance zinc, with an interposed layer of tin between the juxtaposed surfaces of the plies, said layer having a thickness of not more than approximately 0.0002 of an inch, and pressing the juxtaposed surfaces firmly about said layer at an elevated temperature not less than about 900° C. until the plies are intergranularly joined by recrystallized surface grains of the metal of the plies having the tin substantially entirely alloyed in said grains.

7. A hollow composite multiple ply article consisting of bonded sheet metal layers of from about 80% to about 95% copper, from about 1.25% to about 4% iron, and the balance zinc, and across the interface between the abutting portions of adjacent layers an intergranular bond consisting of the adherent and coalesced recrystallized surface grains of said layers of metal on each side of the interface alloyed with substantially all of an amount of tin not in excess of that sufficient for accelerating the recrystallization at elevated temperature of said surface grains only.

8. A composite multiple ply tube structure comprising a convolute wound sheet of metal united upon itself and composed of from about 92% to 94% copper, from about 2% to 2.6% iron and the balance zinc, said sheet having spaced portions defining an internal passageway and also having overlapping juxtaposed surfaces in abutting relationship and across the interface between said surfaces an intergranular union of recrystallized surface grains of the metal in a stage of recrystallization advanced with respect to the rest of said sheet together with an amount of tin substantially completely alloyed with the grains on each side of said interface so as to leave no unalloyed tin in the union and permit substantially no tin penetration into said sheet beyond said surface grains.

9. The method of fabricating composite articles comprising providing at least one sheet of high strength alloyed metal from about 80% to about 95% copper, from about 1.25% to about 4% iron, and the balance zinc having a ductility comparable to that of copper adapting the metal for shaping by deformation and having the characteristic of retaining a substantial part of its tensile strength not less than about 45,000 pounds per square inch after heating to elevated temperature, electrodepositing a uniformly thin coating of tin to at least one surface of said sheet to a thickness sufficient for control of the surface crystals, deforming said coated sheet to provide a desired article configuration in preliminary assembly with a portion of the surfaces of at least one of said sheets in spaced relationship to define a passageway and other portions in juxtaposed abutting relationship, pressing said juxtaposed surfaces into intimate contact at a pressure sufficient to cause a reduction of not more than about 10% in sheet thickness, and while said surfaces are maintained in contact simultaneously heating said assembly to a sufficiently elevated temperature until an intergranular union of substantially not more than the surface grains containing all of said agent completely alloyed therein forms across the interface between said abutting surfaces by localized recrystallization promoted by the initial presence of the crystal control agent at the interface.

10. The method of claim 9 wherein the metal consists of from about 92% to about 94% copper, from about 2% to about 2.6% iron, and the balance zinc.

References Cited in the file of this patent

UNITED STATES PATENTS

| | | |
|---|---|---|
| 68,331 | O'Neill | Aug. 27, 1867 |
| 1,431,368 | Bundy | Oct. 10, 1922 |
| 1,476,796 | Bundy | Dec. 11, 1923 |
| 1,892,607 | Bundy | Dec. 27, 1932 |
| 2,104,884 | Quarnstrom | Jan. 11, 1938 |
| 2,135,886 | Elder | Nov. 8, 1938 |
| 2,292,810 | Woeller | Aug. 11, 1942 |
| 2,295,180 | Mitchell | Sept. 8, 1942 |
| 2,333,968 | Winter | Nov. 9, 1943 |
| 2,539,246 | Hensel | Jan. 23, 1951 |
| 2,633,633 | Bogart | Apr. 7, 1953 |

OTHER REFERENCES

Easy Flo Pamphlet Bulletin No. 14, published 1944, Handy Herman, pages 3–5.